(12) United States Patent
Moseke

(10) Patent No.: US 9,640,900 B2
(45) Date of Patent: May 2, 2017

(54) PLUG-IN CONNECTOR PART COMPRISING A DRAIN

(71) Applicant: Phoenix Contact E-Mobility GmbH, Schieder-Schwalenberg (DE)

(72) Inventor: Dirk Moseke, Hoexter-Luechtringen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/235,120

(22) Filed: Aug. 12, 2016

(65) Prior Publication Data

US 2017/0054248 A1 Feb. 23, 2017

(30) Foreign Application Priority Data

Aug. 17, 2015 (DE) .................. 10 2015 113 519

(51) Int. Cl.
*H01R 13/52* (2006.01)
*H01R 13/504* (2006.01)
*B60L 11/18* (2006.01)

(52) U.S. Cl.
CPC ...... *H01R 13/5227* (2013.01); *B60L 11/1818* (2013.01); *H01R 13/504* (2013.01); *H01R 2201/26* (2013.01)

(58) Field of Classification Search
CPC ............................ H01R 13/5221; H01R 13/24
USPC ........................ 439/274, 275, 587, 588, 37
See application file for complete search history.

(56) References Cited

U.S. PATENT DOCUMENTS

| | | | | |
|---|---|---|---|---|
| 5,350,312 A | * | 9/1994 | Kuno ................. | B60L 11/1818 439/310 |
| 5,478,245 A | | 12/1995 | Okada et al. | |
| 5,800,188 A | * | 9/1998 | Barber .................. | B60D 1/64 220/242 |
| 5,816,643 A | * | 10/1998 | Itou ..................... | B60L 11/1846 296/97.22 |
| 6,375,500 B1 | * | 4/2002 | Murakami ......... | H01R 13/5205 439/196 |

(Continued)

FOREIGN PATENT DOCUMENTS

DE 69428636 T2 5/2002
DE 102013110547 A1 3/2015

(Continued)

*Primary Examiner* — Phuongchi T Nguyen
(74) *Attorney, Agent, or Firm* — Leydig, Voit & Mayer, Ltd.

(57) ABSTRACT

A plug-in connector part for connection to an associated mating plug-in connector part includes a housing part, which has a plug-in portion and a plurality of contact openings arranged in the plug-in portion each having a contact element arranged therein. The plug-in portion being can be brought into a plug-in connection with the associated mating plug-in connector part in a plug-in direction, and has an outer surface extending peripherally around the plug-in direction. The plug-in portion includes a plurality of drainage openings which are each associated with a contact opening and extend from the associated contact opening to the outer surface so as to lead liquid from the associated contact opening to the outer surface. At least one of the drainage openings extends along a first plane and at least a second drainage opening extends along a second plane offset from the first plane in the plug-in direction.

11 Claims, 5 Drawing Sheets

(56) References Cited

U.S. PATENT DOCUMENTS

| | | | |
|---|---|---|---|
| 7,950,930 B2 * | 5/2011 | Yoshida | H01R 13/5227 439/205 |
| 9,352,660 B2 * | 5/2016 | Osawa | B60L 11/1818 |
| 9,472,882 B2 * | 10/2016 | Kurita | H01R 13/424 |
| 9,478,921 B2 * | 10/2016 | Osawa | H01R 13/748 |
| 2016/0248195 A1 | 8/2016 | Feldner | |

FOREIGN PATENT DOCUMENTS

| | | |
|---|---|---|
| EP | 0634818 B1 | 1/1995 |
| EP | 2573880 A1 | 3/2013 |
| WO | WO 2011104609 A1 | 9/2011 |

* cited by examiner

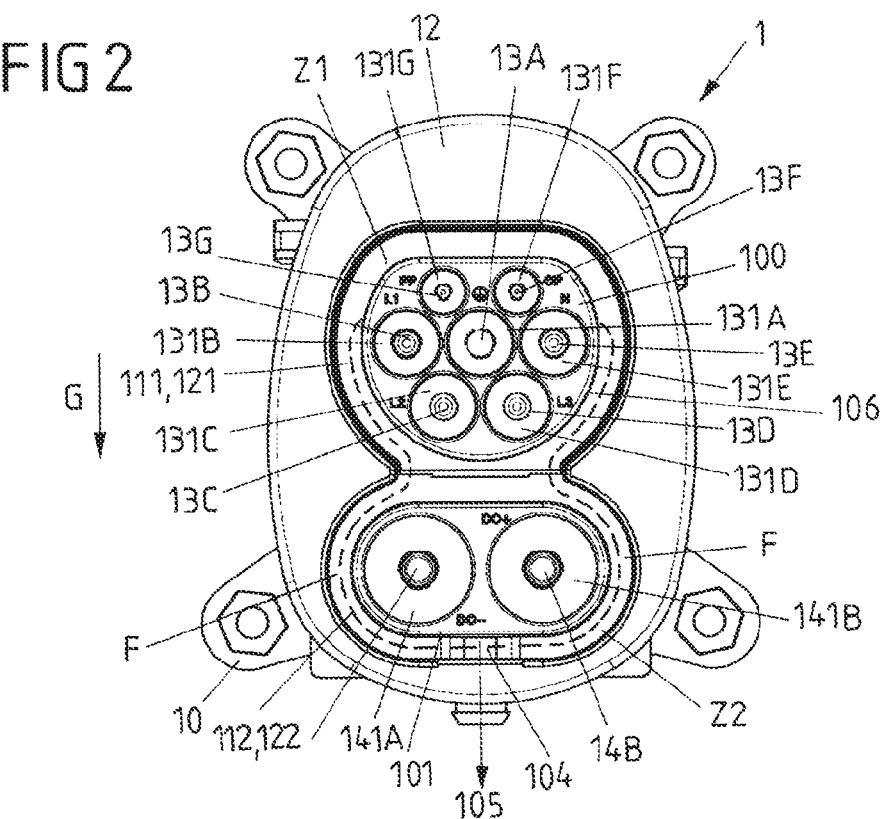
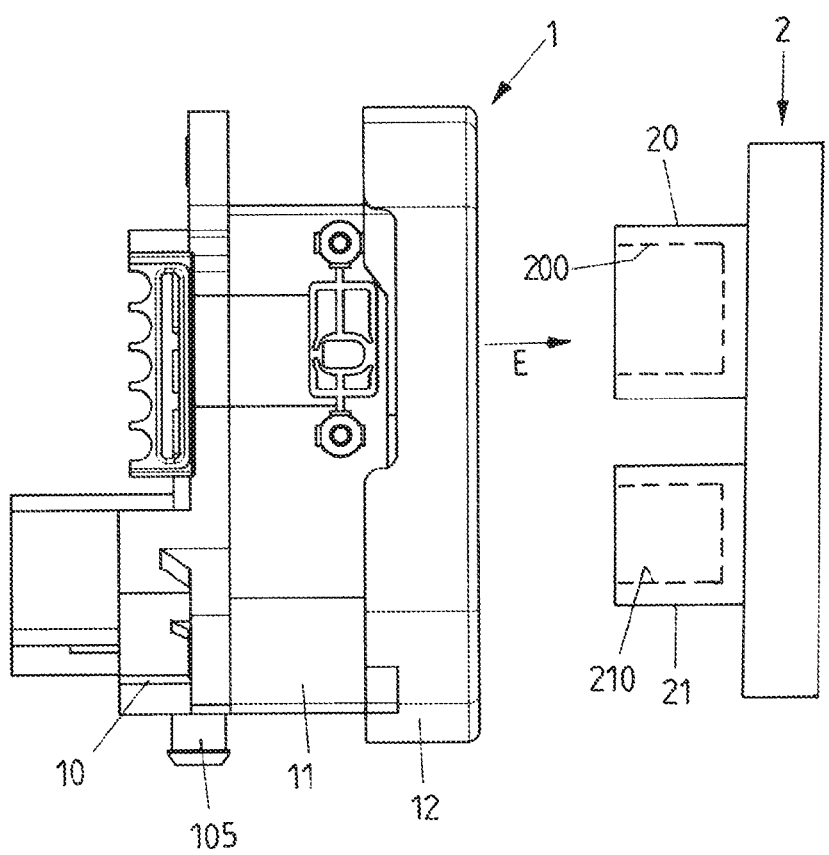

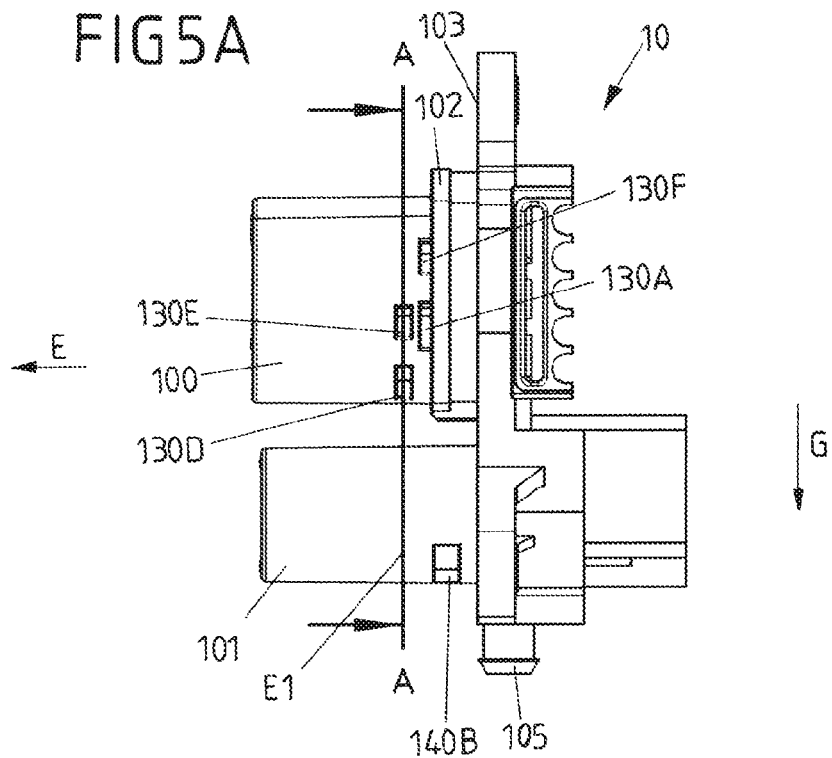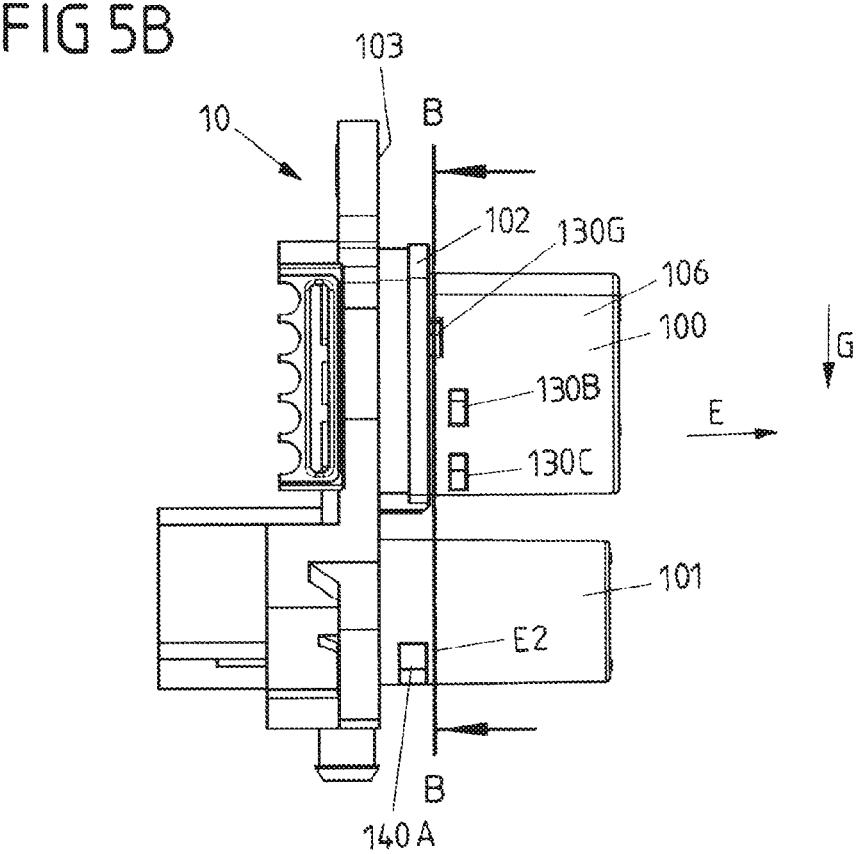

A-A

B-B

PLUG-IN CONNECTOR PART COMPRISING A DRAIN

CROSS-REFERENCE TO PRIOR APPLICATION

Priority is claimed to German Patent Application No. DE 10 2015 113 519.1, filed on Aug. 17, 2015, the entire disclosure of which is hereby incorporated by reference herein.

FIELD

The invention relates to a plug-in connector part for connection to an associated mating plug-in connector part.

BACKGROUND

A plug-in connector part may comprise a housing part, which has a plug-in portion and a plurality of contact openings arranged in the plug-in portion and each having a contact element arranged therein. The plug-in portion can be brought into a plug-in connection with a mating plug-in connector part in a plug-in direction, and has an outer surface extending peripherally around the plug-in direction.

Plug-in connector parts of this type serve for example to transmit a charging current, and are made use of for example in electric vehicles, in charging stations for charging electric vehicles, or in charging cables for connecting an electric vehicle to a charging station.

Because a plug-in connector part, arranged for example on a vehicle, in the form of a charging socket into which a charging plug of a charging cable can be plugged, is also used outdoors in the normal use of the vehicle, and it is difficult if not impossible to seal off the plug-in connector part towards the outside, moisture can penetrate into the plug-in connector part, in particular into the contact openings, for example in rainy weather. It is therefore necessary to ensure that water which gets into the contact openings can also flow away again, in such a way that contacts arranged in the contact openings can securely and reliably be contacted with contacts of a complementary mating plug-in connector part. In particular in the event of frost, water located in a contact opening can potentially freeze, and this can potentially make it impossible to connect a complementary mating plug-in connector part and thus make a charging process impossible.

In plug-in connector parts of this type, it is therefore conventionally provided that a drain to a plane positioned downstream from the contact opening in the plug-in direction is provided at a contact opening, as is disclosed for example in WO 2011/104 609 A1. However, this has the drawback that a space into which drainage is possible, but which also additionally has to be sealed off, has to be provided downstream from the contact openings in the plug-in direction.

There is therefore a need for plug-in connector parts which make drainage possible in a different manner.

In a plug-in connector part known from EP 2 573 880 A1, a drainage system is provided comprising outlet ducts formed to lead water to an outlet line.

Other plug-in connector parts which provide drainage are known for example from DE 694 28 636 T2 and EP 0 634 818 B1.

SUMMARY

A plug-in connector part for connection to an associated mating plug-in connector part includes a housing part, which has a plug-in portion and a plurality of contact openings arranged in the plug-in portion each having a contact element arranged therein. The plug-in portion being can be brought into a plug-in connection with the associated mating plug-in connector part in a plug-in direction, and has an outer surface extending peripherally around the plug-in direction. The plug-in portion includes a plurality of drainage openings which are each associated with a contact opening and extend from the associated contact opening to the outer surface so as to lead liquid from the associated contact opening to the outer surface. At least a first of the drainage openings extends along a first plane and at least a second of the drainage openings extends along a second plane offset from the first plane in the plug-in direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 is a front view of the plug-in connector part;

FIG. 3 is a side view of the plug-in connector part;

FIG. 5A, 5B are side views of the housing part with the section planes drawn in;

DETAILED DESCRIPTION

Figure 1:
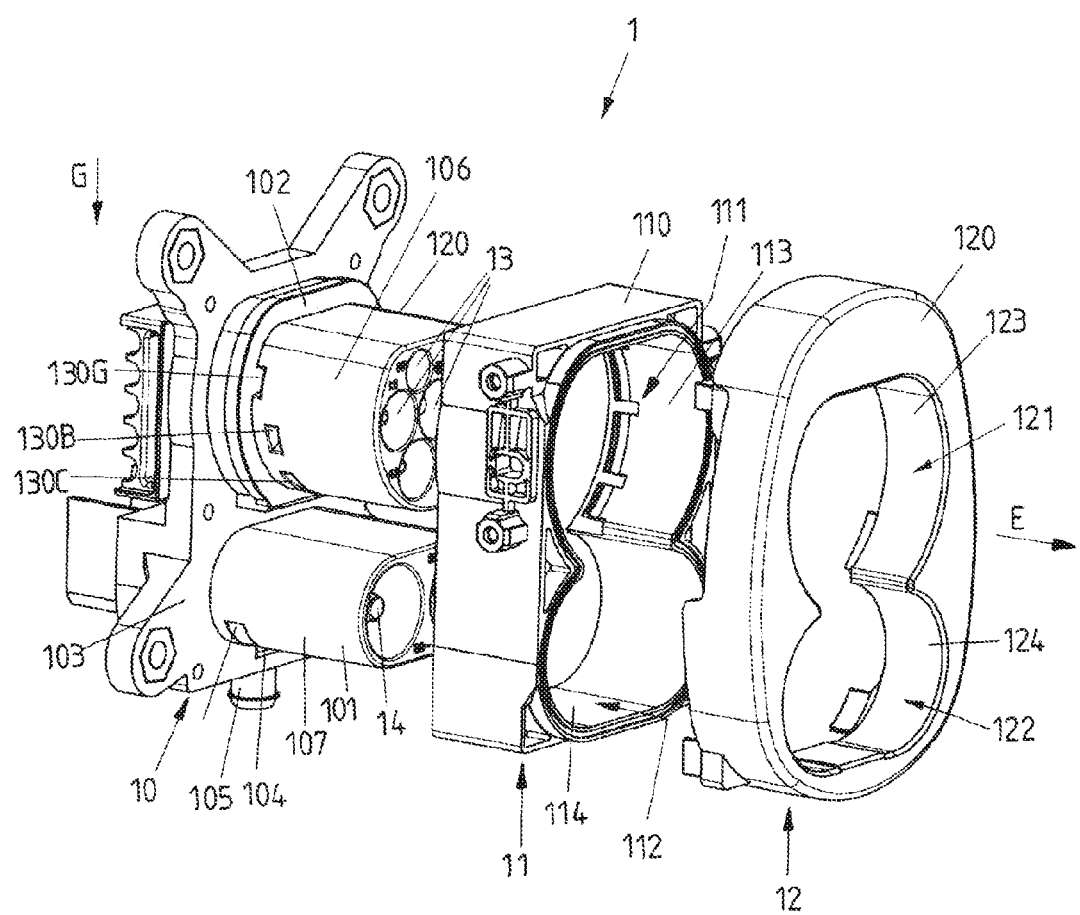
FIG. 1 is a perspective exploded view of a plug-in connector part.
Figure 4:
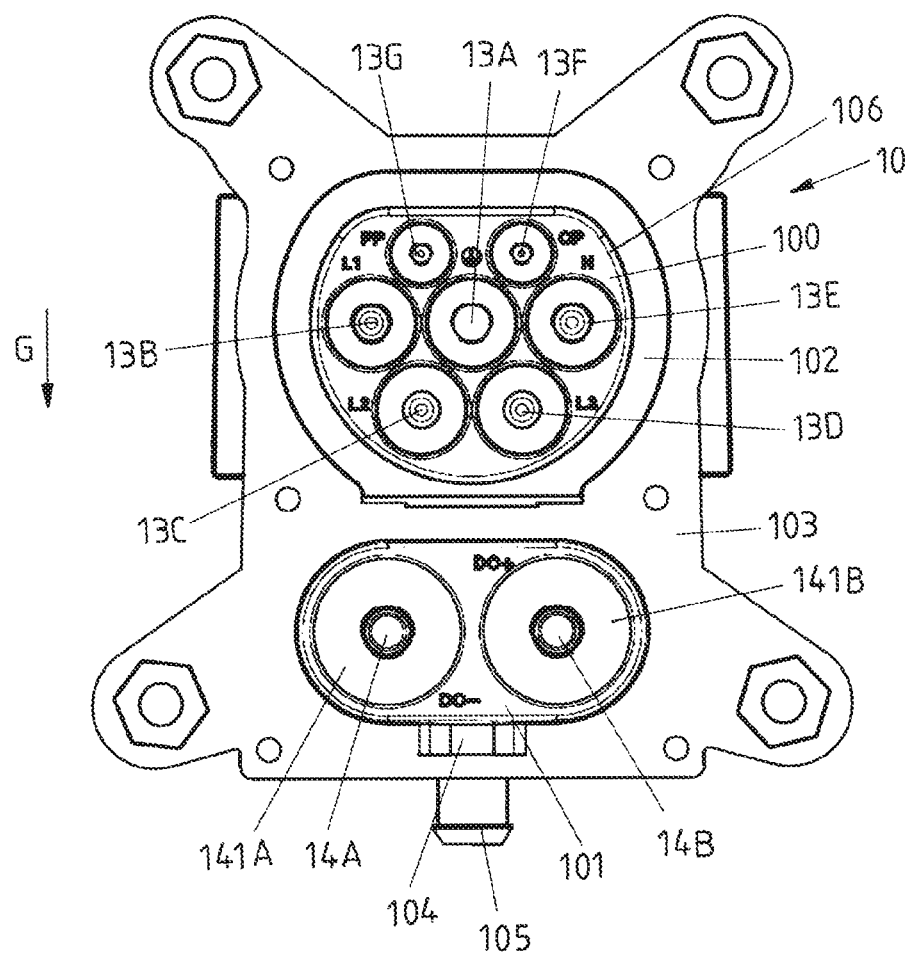
FIG. 4 is a front view of a housing part of the plug-in connector part.

In an embodiment, the plug-in portion comprises a plurality of drainage openings which are each associated with a contact opening and extend from the associated contact opening to the outer surface so as to lead liquid from the associated contact opening to the outer surface, at least one of the drainage openings extending along a first plane and at least one second drainage opening extending along a second plane offset from the first plane in the plug-in direction.

The present invention is based on the idea of providing drainage openings in the plug-in portion which are able to lead liquid, which penetrates into the contact openings of the plug-in portion, to the peripheral outer surface of the plug-in portion. The first plane and the second plane may advantageously extend transverse to the plug-in direction. In this context, the first plane and the second plane preferably extend mutually parallel. However, in this context it is also conceivable and possible for the first plane and the second plane to extend obliquely with respect to the plug-in direction. It is additionally conceivable for the first plane and the second plane not to extend exactly mutually parallel.

Because the drainage openings of different contact openings extend in different planes instead of along the same plane, the housing part can be produced in a simple, cost-effective manner, for example by plastics material injection molding. Thus, in particular in the case of a plurality of contact openings arranged on a plug-in portion for a plurality of contact elements, the drainage openings can be distributed on different planes, and this makes it possible to manufacture the housing part in one piece by plastics material injection molding for example using slides.

The drainage preferably takes place under gravity. For this purpose, the drainage opening associated with a contact opening preferably opens downward—reference being made to an arrangement and use of the plug-in connector part as intended, for example on a vehicle—in such a way that moisture penetrating into the contact opening, for example rainwater, can flow out of the contact opening through the drainage opening under gravity. In this context, the drainage opening is preferably arranged at the lowest point of the contact opening—as considered in the direction of gravity in which gravity acts—in such a way that liquid flows out of the contact opening into the drainage opening under gravity and is led away.

An aperture part having an opening in which the plug-in portion of the housing part is arranged may be provided on the plug-in connector part, the opening being defined by an inner wall which opposes the outer surface of the plug-in portion at a radial distance at least in portions and which forms, together with the outer surface, an intermediate space positioned between the outer surface of the plug-in portion and the inner wall of the aperture part and extending around the plug-in portion. The aperture part serves as an aperture, and extends around the plug-in portion of the housing part in a peripheral direction around the plug-in direction. The intermediate space is enclosed between the outer surface of the plug-in portion and the inner wall of the aperture part, and forms the space into which a plug contour of a complementary mating plug-in connector part can be plugged for connection to the plug-in connector part.

The drainage openings on the plug-in portion thus bring about drainage of moisture out of the contact openings into the intermediate space formed between the plug-in portion of the housing part and the aperture part. Because drainage takes place into the intermediate space between the plug-in portion and the wall of the aperture part, it is not necessary to provide an additional drainage plane downstream from the plug-in plane, provided as standard, of the plug-in connector part. The intermediate space formed between the plug-in portion and the aperture part can be sealed off in a comparatively simple manner, without running the risk of overvoltages at a seal used for this purpose.

The plug-in portion comprises a plurality of contact openings having contacts arranged thereon, it being advantageous for exactly one drainage opening to be associated with each contact opening. In this context, the contact openings extend in the plug-in direction, in such a way that for example contact pins of another plug-in connector part can be introduced into the contact openings in the plug-in direction. The drainage openings preferably extend transverse to the plug-in direction, and thus connect the contact openings to the intermediate space surrounding the plug-in portion, in such a way that moisture can be led out of the contact openings to the outside.

In a specific configuration of a plug-in connector part, the housing part comprises a first plug-in portion and a second plug-in portion, which are spaced apart transverse to the plug-in direction. By contrast, the aperture part comprises a first wall which forms a first intermediate space together with the first plug-in portion, and a second wall which forms a second intermediate space together with the second plug-in portion. A plug-in connector part of this type may for example implement a CCS vehicle-charging plug which is formed both for transmitting an alternating current and for transmitting a direct current for charging a vehicle at different charging stations. For example, in this case charging contacts for transmitting an alternating current may be arranged in the first plug-in portion, whilst the second plug-in portion comprises charging contacts for transmitting a direct current. The intermediate spaces formed in the different plug-in portions may be in a flow connection with one another, for example the first plug-in portion being arranged above the second plug-in portion as considered in the direction of gravity, in such a way that liquid can flow out of the first intermediate space associated with the first plug-in portion into the second intermediate space associated with the second plug-in portion via an opening between the intermediate spaces.

The housing part may for example comprise a base on which the at least one plug-in portion is arranged. In this case, the aperture part is positioned on the base and is sealed off from the base of the hosing part, for example by way of a sealing element. The plug-in portion is raised up from the base, and projects for example cylindrically from the base (the plug-in portion not necessarily having a circular cross section), and the wall of the aperture part is connected to the base and extends around the plug-in portion. By way of the sealing element, simple sealing of the aperture part from the base of the housing part is possible, in such a way that moisture from the intermediate space within the aperture part cannot get into a dry space on the side of the base remote from the aperture part.

To make it possible to lead moisture out of the plug-in connector part, an outlet opening is preferably provided on the base, and is preferably arranged, as considered in the direction of gravity, at a location of the base arranged below the plug-in portion, in such a way that liquid can flow under gravity into the outlet opening and via said opening into an outlet line optionally connected to the outlet opening. Thus, in particular an intermediate space formed between the plug-in portion and the aperture part is drained via the outlet opening, in such a way that water, which could potentially freeze in the event of frost, also cannot collect in the intermediate space.

The outlet opening is advantageously formed integrally in the base of the housing part, in such a way that a liquid can be led away via the base and an outlet line potentially connected thereto. However, it is also conceivable and possible to form an outlet opening integrally for example in the wall of the aperture part, in such a way that the intermediate space can be drained through the wall of the aperture part.

The drainage opening associated with a contact opening extends from the contact opening to the outer surface, extending peripherally around the plug-in direction, of the plug-in portion. The drainage thus takes place via the outer surface of the plug-in portion and thus for example into an intermediate space which is formed between the plug-in portion and the aperture part serving as an aperture. So as to make simple manufacture of the plug-in connector part possible in this context, the housing part and the aperture part are preferably produced as separate molded parts, each in a single piece, for example by plastics material injection molding. Because the housing part and the aperture part are manufactured separately from one another, the drainage openings associated with a plug-in portion can readily be formed integrally in the plug-in portion, making it simple to demold the housing part during production by plastics material injection molding.

The drainage openings may for example be integrally formed in the plug-in portion transverse to the plug-in direction during the plastics material injection molding by way of slides. After the production of the molded parts, the housing part and the aperture part are subsequently placed together, it being possible to seal off a transition between the housing part and the aperture part in a moisture-tight manner for example by means of a suitable sealing element.

FIGS. 1 to 6A, 6B show an embodiment of a plug-in connector part 1, which may for example be arranged on a vehicle or on a charging station as a charging socket and which is used for charging an electrically driven vehicle (also referred to as an electric vehicle).

As is illustrated in FIG. 3, the plug-in connector part 1 can be connected to an associated mating plug-in connector part 2, by bringing plug-in portions 100, 101 of the plug-in connector part 1 into plugged engagement with associated plug-in portions 20, 21 of the mating plug-in connector part 2 in a plug-in direction E. In this context, the plug-in portions 100, 101 may dip into engagement openings 200, 210 of the plug-in portions 20, 21 of the mating plug connector part 2, in such a way that in a connection position the plug-in portions 100, 101 of the mating plug-in connector part 1 are arranged on the plug-in portions 20, 21 of the mating plug-in connector part 2.

Cylindrical contact openings 131A-131G, 141A, 141B (see FIG. 2), in each of which a contact element 13A-13G, 14A, 14B is arranged, are arranged extending axially in the plug-in direction E in the plug-in portions 100, 101. Associated mating contact elements on the plug-in portions 20, 21 of the mating plug-in connector part 2 can be inserted into the contact openings 131A-131G, 141A, 141B, so as electrically to contact the electrical contact elements 13A-13G, 14A, 14B.

The plug-in connector part 1 of the embodiment shown is configured as a CCS vehicle-charging plug, via which a charging current either in the form of an alternating current or in the form of a direct current can selectively be transmitted (it already being noted at this point that the present invention is not limited to CCS vehicle-charging plugs of this type).

In the embodiment shown, seven contact elements 13A-13G, via which a charging current in the form of a multiphase alternating current can be transmitted, are arranged on the upper plug-in portion 100 (as considered in the direction of gravity G). The central contact element 13A (see FIG. 2) represents a neutral conductor in this case. The contact elements 13B-13E form charging contacts for transmitting the actual charging current. The contact element 13F implements a pilot contact, via which the control signals can be transmitted. The contact element 13G implements a proximity contact.

By contrast, the lower plug-in portion (in the direction of gravity G) comprises two contact elements 14A, 14B arranged side by side, via which a charging current in the form of a direct current can be transmitted.

As can be seen from the perspective exploded view of FIG. 1, the plug-in portions 100, 101 are arranged on a base 103 of a housing part 10 and project from the base 103 in the plug-in direction E. The upper plug-in portion 100 is arranged on a raised portion 102 and connected to the base 103 via the raised portion 102.

Two aperture parts 11, 12 are arranged on the housing part 10, and each comprise an opening which is formed by two opening portions 111, 112 or 121, 122 and in which the plug-in portions 100, 101 come to be positioned when the plug-in connector part 1 is assembled.

In this context, the upper plug-in portion 100 is associated with the upper opening portions 111, 121 of the aperture parts 11, 12, whilst the lower plug-in portion 101 is associated with the lower opening portions 112, 122 of the aperture parts 11, 12.

The plug-in portions 100, 101 are each peripherally enclosed by an outer surface 106, 107. When the plug-in connector part 1 is assembled, these outer surfaces 106, 107 are located in opposition to inner walls 113, 114, 123, 124 of the openings of the aperture parts 11, 12, and in this context are spaced apart radially (with respect to the plug-in direction E) from these inner walls 113, 114, 123, 124, resulting in intermediate spaces Z1, Z2 between the plug-in portions 100, 101 and the aperture parts 11, 12 (see FIG. 2).

In this context, the shaping of the plug-in portions 100, 101 and the intermediate spaces Z1, Z2 formed together with the aperture parts 11, 12 is such that the plug-in connector part 1 can be brought into plugged engagement with an associated mating plug-in connector part 2, as is illustrated schematically in FIG. 3.

The plug-in connector part 1 may for example be arranged on a vehicle as a charging socket. Because a vehicle may generally be exposed to moisture, and moisture can thus also get into the region of the plug-in portions 100, 101, the contact openings 131A-131G, 141A, 141B each have a drainage opening 130A-130G, 140A, 140B, via which moisture can be led away from the contact openings 131A-131G and into the intermediate spaces Z1, Z2. As is illustrated in FIG. 2 by way of the flow F, this moisture can flow around the plug-in portions 100, 101 and be led to an outlet opening 104 in the base 102. This outlet opening 104 is in a flow connection with an outlet 105, to which an outlet line can be connected, in such a way that moisture can flow out of the region of the plug-in connector part 1 through said outlet.

Figure 6A:
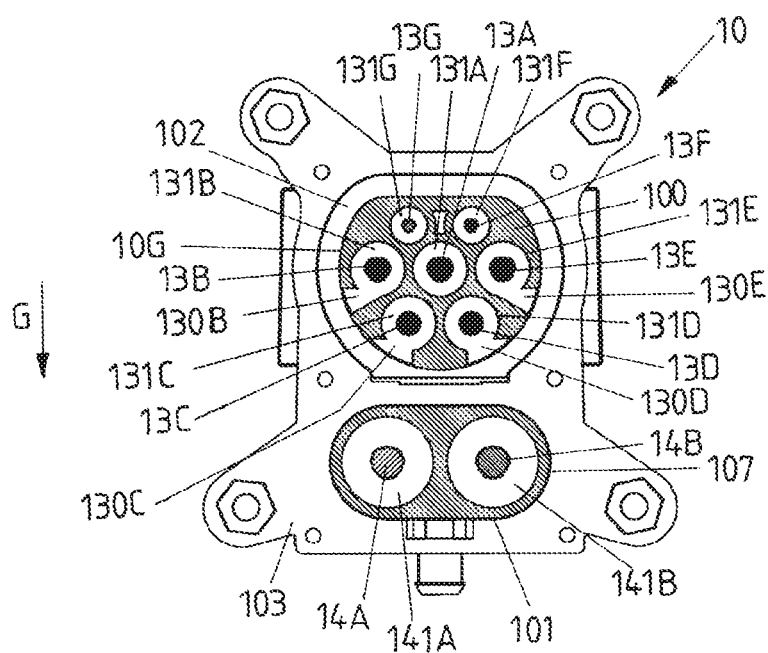
FIG. 6A is a sectional view along the line A-A of FIG. 5A.
Figure 6B:
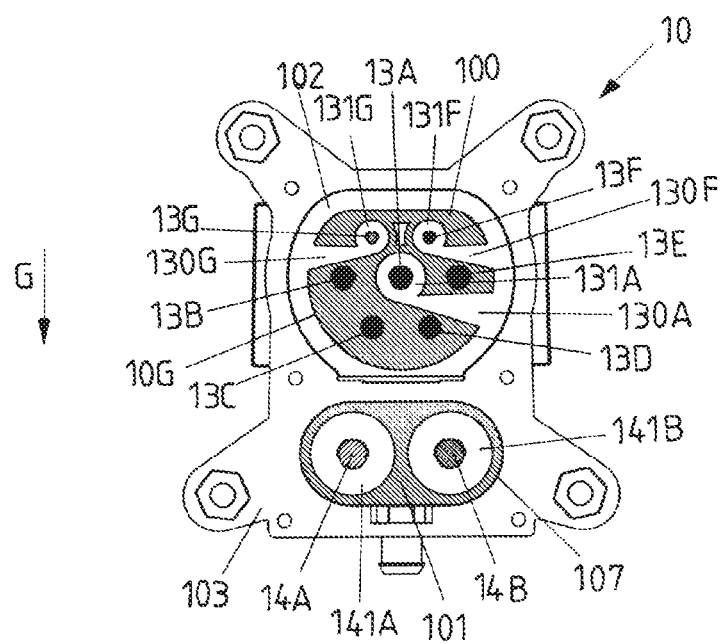
FIG. 6B is a sectional view along the line B-B of FIG. 5B.

As can be seen for example from the sectional view of FIGS. 6A and 6B, the drainage openings 130A-130G, 140A, 140B are each shaped in such a way that they open the associated contact openings 131A-131G, 141A, 141B downward in the direction of gravity G, in such a way that moisture is led out of the contact openings 131A, 131G, 141A, 141B under gravity. (This relates to the arrangement as intended of the plug-in connector part 1, for example on a vehicle as a charging socket.)

As can further be seen from the sectional view of FIGS. 6A and 6B, the drainage openings 130A-130G, 140A, 140B each open an associated contact opening 131A-131G, 141A, 141B to the peripheral outer surface 106, 107 of the associated plug-in portion 100, 101. For this purpose, the drainage openings 130A-130G, 140A, 140B extend transverse to the plug-in direction E between the associated contact opening 131A-131G, 141A, 141B and the outer surface 106, 107.

In the embodiment shown, the drainage openings 130A-130G of the first, upper plug-in portion 100 extend in planes E1, E2 which extend mutually parallel. The drainage openings 130B-130E associated with the charging contacts 13B-13E thus extend in the plane E1, shown in FIG. 6A. By contrast, the drainage openings 130A, 130F, 130G associated with the remaining contact elements 13A, 13F, 13G extend in a second plane E2, shown in FIG. 6B, offset from this first plane E1.

Herein, saying that a drainage opening 130A-130G extends in a plane E1, E2 means that the drainage opening 130A-130G extends along the plane E1, E2. The drainage opening 130A-130G obviously has a (slight) height (measured in the extension direction E), but is substantially elongate in form in the associated plane E1, E2.

As can be seen from FIGS. 5A and 5B, the second plane E1 is positioned closer to the base 103. The contact openings 131A-131G each extend for example only as far as the bottom of the associated drainage opening 130A-130G on the respective plane E1, E2, in such a way that the contact openings 131A-131G of the different contact elements 13A-13G may be of different depths as measured in the plug-in direction E.

Because the drainage openings 130A-130G of the upper plug-in portion 100 thus extend in different planes E1, E2, it becomes possible, in spite of the comparatively large number of contacts on the upper plug-in portion 100, to produce the housing 10 as a single-piece plastics material molded part, for example by plastics material injection molding using slides. Each drainage opening 130A-130G, 140A, 140B can be formed integrally in the relevant plug-in portion 100, 101 using a slide, resulting in the possibility of comparatively simple production by plastics material injection molding.

The planes E1, E2 each extend transverse to the plug-in direction E but mutually offset in the plug-in direction E. In particular, as considered in the plug-in direction E, the drainage openings 130A-130G of the different planes E1, E2 do not overlap one another, and so the drainage openings 130A-130G of the different planes E1, E2 are spatially separated from one another, and moisture cannot flow out of one contact opening 131A-131G into another contact opening 131A-131G.

The idea behind the invention is not limited to the above-disclosed embodiments, but can also in principle be implemented in embodiments of completely different types.

In particular, the plug-in connector part may also merely comprise a single plug-in portion and for example be formed exclusively for transmitting a charging current in the form of a direct current or an alternating current.

In principle, it is also conceivable for the planes not to extend exactly transverse to the plug-in direction, but for example to be orientated obliquely with respect to the plug-in direction. In this context it is also conceivable and possible for the planes not to extend exactly mutually parallel.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Plug-in connector part
10 Housing part
100, 101 Plug-in portion
102 Raised portion
103 Base
104 Outlet opening
105 Outlet
106, 107 Outer surface
11 Aperture part
110 Body
111, 112 Opening portion
12 Aperture part
120 Body
121, 122 Opening portion
13, 14 Contact elements
13A-13G, 14A, 14B Contact elements
130A-130G, 140A, 140B Drainage opening
131A-131G, 141A, 141B Contact opening
2 Mating plug-in connector part
20, 21 Plug-in portion
200, 210 Plug-in opening
E Plug-in direction
E1, E2 Plane
F Flow
G Direction of gravity
Z1, Z2 Intermediate space

What is claimed is:

1. A plug-in connector part for connection to an associated mating plug-in connector part, comprising:
  a housing part, which has a plug-in portion and a plurality of contact openings arranged in the plug-in portion each having a contact element arranged therein, the plug-in portion being configured to be brought into a plug-in connection with the associated mating plug-in connector part in a plug-in direction, and having an outer surface extending peripherally around the plug-in direction,
  wherein the plug-in portion comprises a plurality of drainage openings which are each associated with a contact opening and extend from the associated contact opening to the outer surface so as to lead liquid from the associated contact opening to the outer surface, at least a first of the drainage openings extending along a first plane and at least a second of the drainage openings extending along a second plane offset from the first plane in the plug-in direction.

2. The plug-in connector part according to claim 1, wherein the first plane and the second plane extend transverse to the plug-in direction.

3. The plug-in connector part according to claim 1, wherein the first plane and the second plane extend mutually parallel.

4. The plug-in connector part according to claim 1, wherein each drainage opening is configured to open the associated contact opening thereof downward as considered in the direction of gravity.

5. The plug-in connector part according to claim 1, wherein the housing part comprises a single-piece molded part.

6. The plug-in connector part according to claim 1, wherein the housing part comprises an injection-molded plastics material.

7. The plug-in connector part according to claim 1, wherein the housing part comprises a base on which the plug-in portion is arranged, the base comprising an outlet opening configured to lead liquid away.

8. The plug-in connector part according to claim 7, wherein the outlet opening is arranged on the base below the plug-in portion in the direction of gravity.

9. The plug-in connector part according to claim 1, further comprising an aperture part having an opening in which the plug-in portion is arranged, the opening being defined by an inner wall which opposes the outer surface of the plug-in portion at least in portions and which forms, together with the outer surface, an intermediate space positioned between the outer surface of the plug-in portion and the inner wall of the aperture part.

10. The plug-in connector part according to claim 9, wherein the housing part comprises a first plug-in portion and a second plug-in portion that are spaced apart transverse to the plug-in direction, the aperture part comprising a first wall that forms a first intermediate space together with the first plug-in portion, and a second wall that forms a second intermediate space together with the second plug-in portion.

11. The plug-in connector part according to claim 10, wherein the first intermediate space and the second intermediate space are in a flow connection.

* * * * *